United States Patent
Haka

(10) Patent No.: US 10,030,748 B2
(45) Date of Patent: Jul. 24, 2018

(54) CONTINUOUSLY VARIABLE TRANSMISSION

(71) Applicant: DANA LIMITED, Maumee, OH (US)

(72) Inventor: Raymond James Haka, Brighton, MI (US)

(73) Assignee: Dana Limited, Maumee, OH (US)

( * ) Notice: Subject to any disclaimer, the term of this patent is extended or adjusted under 35 U.S.C. 154(b) by 594 days.

(21) Appl. No.: 14/442,580

(22) PCT Filed: Nov. 14, 2013

(86) PCT No.: PCT/US2013/070177
§ 371 (c)(1),
(2) Date: May 13, 2015

(87) PCT Pub. No.: WO2014/078583
PCT Pub. Date: May 22, 2014

(65) Prior Publication Data
US 2016/0281828 A1 Sep. 29, 2016

Related U.S. Application Data

(60) Provisional application No. 61/779,579, filed on Mar. 13, 2013, provisional application No. 61/727,689, filed on Nov. 17, 2012.

(51) Int. Cl.
*F16H 15/28* (2006.01)
*F16H 37/02* (2006.01)

(52) U.S. Cl.
CPC ........... *F16H 37/021* (2013.01); *F16H 15/28* (2013.01); *F16H 2037/025* (2013.01)

(58) Field of Classification Search
CPC ... F16H 15/28; F16H 37/021; F16H 2037/025
USPC ..................................... 476/38, 721; 74/721
See application file for complete search history.

(56) References Cited

U.S. PATENT DOCUMENTS

| 1,063,244 A | 6/1913 | Ludwig |
| 1,215,969 A | 2/1917 | Thomas |
| 1,526,140 A | 2/1925 | Gruver |
| 2,019,006 A | 10/1935 | Ferrarl |

(Continued)

FOREIGN PATENT DOCUMENTS

| AU | 2011224083 A1 | 10/2011 |
| CN | 101392825 A | 3/2009 |

(Continued)

OTHER PUBLICATIONS

PCT/US2014/041124 International Preliminary Report on Patentability dated Dec. 17, 2015.

(Continued)

*Primary Examiner* — William C Joyce
(74) *Attorney, Agent, or Firm* — Marshall & Melhorn, LLC

(57) ABSTRACT

A continuously variable transmission provides an increased transmission speed ratio with fewer parts. A kinematic arrangement can provide at least a squared kinematic arrangement of the variator for two or more modes, for example, and can provide an increased range transmission speed ratio with fewer moving parts. In many embodiments, the continuously variable transmission provides synchronous gear ratios and a continuously variable speed ratio.

19 Claims, 5 Drawing Sheets

(56) References Cited

U.S. PATENT DOCUMENTS

| | | | |
|---|---|---|---|
| 2,060,884 A | 11/1936 | Madle | |
| 2,148,759 A | 2/1939 | Grand | |
| 2,405,201 A | 8/1946 | Franck | |
| 2,660,897 A | 12/1953 | Neidhart et al. | |
| 2,729,118 A | 1/1956 | Emslie | |
| 2,931,235 A | 4/1960 | Hayward | |
| 3,203,278 A | 8/1965 | General | |
| 3,246,531 A * | 4/1966 | Kashihara | F16H 15/28 475/189 |
| 3,376,633 A | 4/1968 | Wesley | |
| 3,407,687 A | 10/1968 | Hayashi | |
| 3,470,720 A | 10/1969 | Phillip et al. | |
| 3,505,718 A | 4/1970 | Carl | |
| 3,583,060 A | 6/1971 | Maurice | |
| 3,688,600 A | 9/1972 | Allan | |
| 3,765,270 A | 10/1973 | Lemieux | |
| 3,774,280 A | 11/1973 | Eklund et al. | |
| 3,831,245 A | 8/1974 | Amos | |
| 3,894,559 A | 7/1975 | Depuy | |
| 4,046,988 A | 9/1977 | Okuda et al. | |
| 4,187,709 A | 2/1980 | Legate et al. | |
| 4,226,140 A | 10/1980 | Gaasenbeek | |
| 4,333,358 A | 6/1982 | Grattapaglia | |
| 4,344,336 A | 8/1982 | Carriere | |
| 4,360,090 A | 11/1982 | Wonn | |
| 4,368,572 A | 1/1983 | Kanazawa et al. | |
| 4,458,558 A * | 7/1984 | Frank | F16H 37/021 474/28 |
| 4,464,952 A | 8/1984 | Stubbs | |
| 4,539,866 A * | 9/1985 | Koivunen | F16H 37/021 475/204 |
| 4,630,504 A * | 12/1986 | Smirl | F16H 37/021 192/48.6 |
| 4,693,134 A | 9/1987 | Kraus | |
| 4,731,044 A | 3/1988 | Mott | |
| 4,756,211 A | 7/1988 | Fellows | |
| 4,784,017 A | 11/1988 | Johnshoy | |
| 4,856,371 A | 8/1989 | Kemper | |
| 4,856,374 A | 8/1989 | Kreuzer | |
| 4,885,955 A * | 12/1989 | Kraus | F16H 37/086 475/185 |
| 4,950,208 A | 8/1990 | Tomlinson | |
| 4,963,122 A | 10/1990 | Ryan | |
| 4,963,124 A | 10/1990 | Takahashi et al. | |
| 5,109,962 A | 5/1992 | Sato | |
| 5,168,778 A | 12/1992 | Todd et al. | |
| 5,217,412 A | 6/1993 | Indlekofer et al. | |
| 5,230,670 A | 7/1993 | Hibi | |
| 5,238,460 A | 8/1993 | Esaki et al. | |
| 5,318,486 A | 6/1994 | Lutz | |
| 5,390,759 A | 2/1995 | Gollner | |
| 5,401,221 A | 3/1995 | Fellows et al. | |
| 5,520,588 A | 5/1996 | Hall, III | |
| 5,527,231 A | 6/1996 | Seidel et al. | |
| 5,577,423 A | 11/1996 | Mimura | |
| 5,599,251 A | 2/1997 | Beim et al. | |
| 5,659,956 A | 8/1997 | Braginsky et al. | |
| 5,683,322 A | 11/1997 | Meyerle | |
| 5,726,353 A | 3/1998 | Matsuda et al. | |
| 5,730,678 A | 3/1998 | Larkin | |
| 5,766,105 A | 6/1998 | Fellows et al. | |
| 5,776,028 A | 7/1998 | Matsuda et al. | |
| 5,800,303 A | 9/1998 | Benford | |
| 5,860,888 A | 1/1999 | Lee | |
| 5,915,801 A | 6/1999 | Taga et al. | |
| 5,961,415 A | 10/1999 | Justice et al. | |
| 5,971,883 A | 10/1999 | Klemen | |
| 5,996,226 A | 12/1999 | Gibbs | |
| 6,009,365 A | 12/1999 | Takahara et al. | |
| 6,036,616 A | 3/2000 | McCarrick et al. | |
| 6,045,477 A | 4/2000 | Schmidt | |
| 6,053,839 A | 4/2000 | Baldwin et al. | |
| 6,059,685 A | 5/2000 | Hoge et al. | |
| 6,071,208 A | 6/2000 | Koivunen | |
| 6,080,080 A | 6/2000 | Bolz et al. | |
| 6,083,135 A | 7/2000 | Baldwin et al. | |
| 6,086,504 A | 7/2000 | Illerhaus | |
| 6,089,287 A | 7/2000 | Welsh et al. | |
| 6,095,942 A | 8/2000 | Yamaguchi et al. | |
| 6,155,951 A | 12/2000 | Kuhn et al. | |
| 6,217,474 B1 | 4/2001 | Ross et al. | |
| 6,251,038 B1 | 6/2001 | Ishikawa et al. | |
| 6,273,838 B1 | 8/2001 | Park | |
| 6,342,026 B1 | 1/2002 | Takagi et al. | |
| 6,358,178 B1 | 3/2002 | Wittkopp | |
| 6,371,880 B1 | 4/2002 | Kam | |
| 6,481,258 B1 | 11/2002 | Belinky | |
| 6,554,735 B2 | 4/2003 | Kanazawa | |
| 6,558,285 B1 | 5/2003 | Sieber | |
| 6,585,619 B2 | 7/2003 | Henzler | |
| 6,609,994 B2 | 8/2003 | Muramoto | |
| 6,632,157 B1 | 10/2003 | Gierling et al. | |
| 6,641,497 B2 | 11/2003 | Deschamps et al. | |
| 6,645,106 B2 | 11/2003 | Goo et al. | |
| 6,689,012 B2 | 2/2004 | Miller et al. | |
| 6,705,964 B2 | 3/2004 | Nagai et al. | |
| 6,719,659 B2 | 4/2004 | Geiberger et al. | |
| 6,723,016 B2 | 4/2004 | Sumi | |
| 6,726,590 B2 | 4/2004 | Henzler et al. | |
| 6,733,412 B2 | 5/2004 | Kumagai et al. | |
| 6,752,696 B2 | 6/2004 | Murai et al. | |
| 6,793,603 B2 | 9/2004 | Teraoka et al. | |
| 6,849,020 B2 | 2/2005 | Sumi | |
| 6,866,606 B2 | 3/2005 | Ooyama | |
| 6,949,045 B2 | 9/2005 | Wafzig et al. | |
| 6,979,275 B2 | 12/2005 | Hiraku et al. | |
| 6,986,725 B2 | 1/2006 | Morscheck | |
| 7,033,298 B2 | 4/2006 | Usoro et al. | |
| 7,074,154 B2 | 7/2006 | Miller | |
| 7,086,981 B2 | 8/2006 | Ali et al. | |
| 7,104,917 B2 | 9/2006 | Klemen et al. | |
| 7,128,681 B2 | 10/2006 | Sugino et al. | |
| 7,160,220 B2 | 1/2007 | Shinojima et al. | |
| 7,186,199 B1 | 3/2007 | Baxter, Jr. | |
| 7,217,214 B2 | 5/2007 | Morscheck et al. | |
| 7,234,543 B2 | 6/2007 | Schaaf | |
| 7,288,044 B2 | 10/2007 | Gumpoltsberger | |
| 7,311,634 B2 | 12/2007 | Shim et al. | |
| 7,335,126 B2 | 2/2008 | Tsuchiya et al. | |
| 7,347,801 B2 | 3/2008 | Guenter et al. | |
| 7,396,309 B2 | 7/2008 | Heitz et al. | |
| 7,431,677 B2 | 10/2008 | Miller et al. | |
| 7,470,210 B2 | 12/2008 | Miller et al. | |
| 7,473,202 B2 | 1/2009 | Morscheck et al. | |
| 7,485,069 B2 | 2/2009 | Jang et al. | |
| 7,497,798 B2 | 3/2009 | Kim | |
| 7,588,514 B2 | 9/2009 | McKenzie et al. | |
| 7,637,838 B2 | 12/2009 | Gumpoltsberger | |
| 7,672,770 B2 | 3/2010 | Inoue et al. | |
| 7,686,729 B2 | 3/2010 | Miller et al. | |
| 7,717,815 B2 | 5/2010 | Tenberge | |
| 7,727,107 B2 | 6/2010 | Miller | |
| 7,780,566 B2 | 8/2010 | Seo | |
| 7,874,153 B2 | 1/2011 | Behm | |
| 7,878,935 B2 | 2/2011 | Lahr | |
| 7,951,035 B2 | 5/2011 | Platt | |
| 7,980,972 B1 | 7/2011 | Starkey et al. | |
| 8,029,401 B2 | 10/2011 | Johnson | |
| 8,052,569 B2 | 11/2011 | Tabata et al. | |
| 8,062,175 B2 | 11/2011 | Krueger et al. | |
| 8,066,614 B2 | 11/2011 | Miller et al. | |
| 8,142,323 B2 | 3/2012 | Tsuchiya et al. | |
| 8,226,518 B2 | 7/2012 | Parraga | |
| 8,257,216 B2 | 9/2012 | Hoffman | |
| 8,257,217 B2 | 9/2012 | Hoffman | |
| 8,287,414 B2 | 10/2012 | Weber et al. | |
| 8,313,404 B2 | 11/2012 | Carter et al. | |
| 8,376,903 B2 | 2/2013 | Pohl et al. | |
| 8,382,636 B2 | 2/2013 | Shiina et al. | |
| 8,447,480 B2 | 5/2013 | Usukura | |
| 8,469,856 B2 | 6/2013 | Thomassy | |
| 8,545,368 B1 | 10/2013 | Davis et al. | |
| 8,594,867 B2 | 11/2013 | Heap et al. | |

(56) References Cited

U.S. PATENT DOCUMENTS

| | | |
|---|---|---|
| 8,622,871 B2 | 1/2014 | Hoff |
| 8,639,419 B2 | 1/2014 | Roli et al. |
| 8,668,614 B2 | 3/2014 | Sherrill et al. |
| 8,678,975 B2 | 3/2014 | Koike |
| 8,870,711 B2 | 10/2014 | Pohl et al. |
| 8,888,643 B2 | 11/2014 | Lohr et al. |
| 8,926,468 B2 | 1/2015 | Versteyhe et al. |
| 8,986,150 B2 | 3/2015 | Versteyhe et al. |
| 9,052,000 B2 | 6/2015 | Cooper |
| 9,114,799 B2 | 8/2015 | Tsukamoto et al. |
| 9,156,463 B2 | 10/2015 | Legner et al. |
| 2002/0004438 A1 | 1/2002 | Toukura et al. |
| 2002/0094911 A1 | 7/2002 | Haka |
| 2002/0169048 A1 | 11/2002 | Henzler et al. |
| 2003/0060318 A1 | 3/2003 | Sumi |
| 2003/0181280 A1 | 9/2003 | Elser et al. |
| 2003/0200783 A1 | 10/2003 | Shai |
| 2003/0213125 A1 | 11/2003 | Chiuchang |
| 2003/0216121 A1 | 11/2003 | Yarkosky |
| 2003/0228952 A1 | 12/2003 | Joe et al. |
| 2004/0058769 A1 | 3/2004 | Larkin |
| 2004/0061639 A1 | 4/2004 | Voigtlaender et al. |
| 2004/0166984 A1 | 8/2004 | Inoue |
| 2004/0167391 A1 | 8/2004 | Solar et al. |
| 2004/0171452 A1 | 9/2004 | Miller et al. |
| 2005/0102082 A1 | 5/2005 | Joe et al. |
| 2005/0137046 A1 | 6/2005 | Miller et al. |
| 2005/0153810 A1 | 7/2005 | Miller et al. |
| 2006/0094515 A1 | 5/2006 | Szuba et al. |
| 2006/0234822 A1 | 10/2006 | Morscheck et al. |
| 2006/0276294 A1 | 12/2006 | Coffey et al. |
| 2007/0021259 A1 | 1/2007 | Tenberge |
| 2007/0032327 A1 | 2/2007 | Raghavan et al. |
| 2007/0042856 A1 | 2/2007 | Greenwood et al. |
| 2007/0072732 A1 | 3/2007 | Klemen |
| 2007/0096556 A1 | 5/2007 | Kokubo et al. |
| 2007/0270270 A1 | 11/2007 | Miller et al. |
| 2007/0275808 A1 | 11/2007 | Iwanaka et al. |
| 2008/0039273 A1 | 2/2008 | Smithson et al. |
| 2008/0103002 A1 | 5/2008 | Holmes |
| 2008/0121487 A1 | 5/2008 | Miller et al. |
| 2008/0185201 A1 | 8/2008 | Bishop |
| 2009/0017959 A1 | 1/2009 | Triller |
| 2009/0048054 A1 | 2/2009 | Tsuchiya et al. |
| 2009/0062064 A1 | 3/2009 | Kamada et al. |
| 2009/0132135 A1 | 5/2009 | Quinn, Jr. et al. |
| 2009/0221391 A1 | 9/2009 | Bazyn et al. |
| 2009/0221393 A1 | 9/2009 | Kassler |
| 2009/0286651 A1 | 11/2009 | Tanaka et al. |
| 2009/0312137 A1 | 12/2009 | Rohs et al. |
| 2010/0056322 A1 | 3/2010 | Thomassy |
| 2010/0093476 A1 | 4/2010 | Carter et al. |
| 2010/0093479 A1 | 4/2010 | Carter et al. |
| 2010/0106386 A1 | 4/2010 | Krasznai et al. |
| 2010/0113211 A1 | 5/2010 | Schneider |
| 2010/0137094 A1 | 6/2010 | Pohl |
| 2010/0141193 A1 | 6/2010 | Rotondo et al. |
| 2010/0244755 A1 | 9/2010 | Kinugasa et al. |
| 2010/0267510 A1 | 10/2010 | Nichols et al. |
| 2010/0282020 A1 | 11/2010 | Greenwood et al. |
| 2010/0304915 A1 | 12/2010 | Lahr |
| 2010/0310815 A1 | 12/2010 | Mendonca et al. |
| 2011/0015021 A1 | 1/2011 | Maguire et al. |
| 2011/0034284 A1 | 2/2011 | Pohl et al. |
| 2011/0152031 A1 | 6/2011 | Schoolcraft |
| 2011/0165982 A1 | 7/2011 | Hoffman et al. |
| 2011/0165985 A1 | 7/2011 | Hoffman et al. |
| 2011/0165986 A1 | 7/2011 | Hoffman et al. |
| 2011/0230297 A1 | 9/2011 | Shiina et al. |
| 2011/0300954 A1 | 12/2011 | Szuba et al. |
| 2011/0319222 A1 | 12/2011 | Ogawa et al. |
| 2012/0024991 A1 | 2/2012 | Pilch et al. |
| 2012/0035016 A1 | 2/2012 | Miller et al. |
| 2012/0040794 A1 | 2/2012 | Schoolcraft |
| 2012/0122624 A1 | 5/2012 | Hawkins, Jr. et al. |
| 2012/0142477 A1 | 6/2012 | Winter |
| 2012/0165154 A1 | 6/2012 | Wittkopp et al. |
| 2012/0231925 A1 | 9/2012 | Shiina et al. |
| 2012/0244990 A1 | 9/2012 | Ogawa et al. |
| 2012/0309579 A1 | 12/2012 | Miller et al. |
| 2013/0130859 A1 | 5/2013 | Lundberg et al. |
| 2013/0133965 A1 | 5/2013 | Books |
| 2013/0184115 A1 | 7/2013 | Urabe et al. |
| 2013/0190131 A1 | 7/2013 | Versteyhe et al. |
| 2013/0226416 A1 | 8/2013 | Seipold et al. |
| 2013/0303325 A1 | 11/2013 | Carey et al. |
| 2013/0304344 A1 | 11/2013 | Abe |
| 2013/0338888 A1 | 12/2013 | Long et al. |
| 2014/0194243 A1 | 7/2014 | Versteyhe et al. |
| 2014/0223901 A1 | 8/2014 | Versteyhe et al. |
| 2014/0274536 A1 | 9/2014 | Versteyhe et al. |
| 2014/0274540 A1 | 9/2014 | Schoolcraft |
| 2014/0274552 A1 | 9/2014 | Frink et al. |
| 2014/0329637 A1 | 11/2014 | Thomassy et al. |
| 2015/0024899 A1 | 1/2015 | Phillips |
| 2015/0051801 A1 | 2/2015 | Quinn, Jr. et al. |
| 2015/0111683 A1 | 4/2015 | Versteyhe |
| 2015/0142281 A1 | 5/2015 | Versteyhe |
| 2015/0159741 A1 | 6/2015 | Versteyhe |
| 2015/0204429 A1 | 7/2015 | Versteyhe et al. |
| 2015/0204430 A1 | 7/2015 | Versteyhe |
| 2015/0226294 A1 | 8/2015 | Ziech et al. |
| 2015/0226298 A1 | 8/2015 | Versteyhe |
| 2015/0226299 A1 | 8/2015 | Cooper et al. |
| 2015/0252881 A1 | 9/2015 | Versteyhe |
| 2015/0354676 A1 | 12/2015 | Versteyhe et al. |
| 2016/0033021 A1 | 2/2016 | Cooper et al. |
| 2016/0047448 A1 | 2/2016 | Versteyhe et al. |
| 2016/0109001 A1 | 4/2016 | Schoolcraft |
| 2016/0123438 A1 | 5/2016 | Ziech et al. |
| 2016/0131235 A1 | 5/2016 | Phillips |
| 2016/0185353 A1 | 6/2016 | Honma et al. |
| 2016/0290458 A1 | 10/2016 | Taskiran et al. |

FOREIGN PATENT DOCUMENTS

| | | |
|---|---|---|
| CN | 101617146 A | 12/2009 |
| CN | 202165536 U | 3/2012 |
| DE | 1237380 B | 3/1967 |
| DE | 3245045 A1 | 6/1984 |
| DE | 102005010751 A1 | 9/2006 |
| EP | 0156936 A1 | 10/1985 |
| EP | 0210053 A2 | 1/1987 |
| EP | 1061288 A2 | 12/2000 |
| EP | 2113056 B1 | 7/2012 |
| FR | 796188 A | 3/1936 |
| FR | 1030702 A | 6/1953 |
| FR | 1472282 A | 3/1967 |
| FR | 2185076 A5 | 12/1973 |
| FR | 2280451 A1 | 2/1976 |
| FR | 2918433 A1 | 1/2009 |
| GB | 1127825 A | 9/1968 |
| GB | 2196892 A | 5/1988 |
| GB | 2248895 A | 4/1992 |
| JP | H09119506 A | 5/1997 |
| JP | 2006-322482 | * 11/2006 |
| JP | 2008180214 A | 8/2008 |
| JP | 2009058085 A | 3/2009 |
| JP | 2011153583 A | 8/2011 |
| WO | WO-2006002457 A1 | 1/2006 |
| WO | WO-2006041718 A2 | 4/2006 |
| WO | WO-2007046722 A1 | 4/2007 |
| WO | WO-2007051827 A1 | 5/2007 |
| WO | WO-2008103543 A1 | 8/2008 |
| WO | WO-2011011991 A1 | 2/2011 |
| WO | WO-2012008884 A1 | 1/2012 |
| WO | WO-2012177187 A1 | 12/2012 |
| WO | WO-2013109723 A1 | 7/2013 |
| WO | WO-2013123117 A1 | 8/2013 |
| WO | WO-2014039438 A2 | 3/2014 |
| WO | WO-2014039439 A1 | 3/2014 |
| WO | WO-2014039440 A1 | 3/2014 |
| WO | WO-2014039447 A1 | 3/2014 |
| WO | WO-2014039448 A2 | 3/2014 |

(56) References Cited

FOREIGN PATENT DOCUMENTS

| | | |
|---|---|---|
| WO | WO-2014039708 A1 | 3/2014 |
| WO | WO-2014039713 A1 | 3/2014 |
| WO | WO-2014039846 A2 | 3/2014 |
| WO | WO-2014039900 A1 | 3/2014 |
| WO | WO-2014039901 A1 | 3/2014 |
| WO | WO-2014078583 A1 | 5/2014 |
| WO | WO-2014124291 A1 | 8/2014 |
| WO | WO-2014151889 A2 | 9/2014 |
| WO | WO-2014159755 A2 | 10/2014 |
| WO | WO-2014159756 A2 | 10/2014 |
| WO | WO-2014165259 A1 | 10/2014 |
| WO | WO-2014179717 A1 | 11/2014 |
| WO | WO-2014179719 A1 | 11/2014 |
| WO | WO-2014186732 A1 | 11/2014 |
| WO | WO-2014197711 A1 | 12/2014 |
| WO | WO-2015059601 A1 | 4/2015 |
| WO | WO-2015073883 A1 | 5/2015 |
| WO | WO-2015073887 A1 | 5/2015 |
| WO | WO-2015073948 A2 | 5/2015 |
| WO | WO-2015195759 A2 | 12/2015 |
| WO | WO-2015200769 A1 | 12/2015 |
| WO | WO-2016094254 A1 | 6/2016 |

OTHER PUBLICATIONS

PCT/US2015/36170 International Search Report and Written Opinion dated Dec. 17, 2015.
PCT/US2015/64087 International Search Report and Written Opinion dated Feb. 11, 2016.
U.S. Appl. No. 13/743,951 Office Action dated Jan. 21, 2016.
PCT/US2014/015352 International Search Report and Written Opinion dated May 27, 2014.
U.S. Appl. No. 13/743,951 Office Action dated Aug. 19, 2015.
U.S. Appl. No. 14/175,584 Office Action dated Apr. 2, 2015.
U.S. Appl. No. 60/616,399, filed Oct. 5, 2004.
Co-pending U.S. Appl. No. 15/209,487, filed Jul. 13, 2016.
Co-pending U.S. Appl. No. 15/215,179, filed Jul. 20, 2016.
PCT/US2016/29853 International Search Report and Written Opinion dated Aug. 8, 2016.
U.S. Appl. No. 14/334,538 Office Action dated Jul. 29, 2016.
Fallbrook Technologies. 'NuVinci® Technology', Feb. 26, 2013; [retrieved on Jun. 5, 2014]. Retrieved from internet: <URL: https://web.archive.org/web/20130226233109/http://www.fallbrooktech.com/nuvinci-technology.
Moore et al. A Three Revolute Cobot Using CVTs in Parallel, Proceedings of IMECE, 1999, 6 pgs.
PCT/US2013/021890 International Preliminary Report on Patentability dated Jul. 31, 2014.
PCT/US2013/021890 International Search Report dated Apr. 10, 2013.
PCT/US2013/026037 International Preliminary Report on Patentability dated Aug. 28, 2014.
PCT/US2013/026037 International Search Report dated Jul. 15, 2013.
PCT/US2013/057837 International Preliminary Report on Patentability dated Mar. 19, 2015.
PCT/US2013/057837 International Search Report and Written Opinion dated Mar. 31, 2014.
PCT/US2013/057838 International Preliminary Report on Patentability dated Mar. 19, 2015.
PCT/US2013/057838 International Search Report and Written Opinion dated Jan. 17, 2014.
PCT/US2013/057839 International Preliminary Report on Patentability dated Mar. 19, 2015.
PCT/US2013/057839 International Search Report and Written Opinion dated Feb. 6, 2014.
PCT/US2013/057866 International Preliminary Report on Patentability dated Mar. 19, 2015.
PCT/US2013/057866 International Search Report dated Feb. 11, 2014.
PCT/US2013/057868 International Preliminary Report on Patentability dated Mar. 19, 2015.
PCT/US2013/057868 International Search Report and Written Opinion dated Apr. 9, 2014.
PCT/US2013/058309 International Preliminary Report on Patentability dated Mar. 19, 2015.
PCT/US2013/058309 International Search Report and Written Opinion dated Feb. 11, 2014.
PCT/US2013/058318 International Preliminary Report on Patentability dated Mar. 19, 2015.
PCT/US2013/058318 International Search Report and Written Opinion dated Feb. 11, 2014.
PCT/US2013/058545 International Preliminary Report on Patentability dated Mar. 19, 2015.
PCT/US2013/058545 International Search Report and Written Opinion dated Feb. 19, 2014.
PCT/US2013/058615 International Preliminary Report on Patentability dated Mar. 19, 2015.
PCT/US2013/058615 International Search Report and Written Opinion dated Feb. 11, 2014.
PCT/US2013/058616 International Preliminary Report on Patentability dated Mar. 19, 2015.
PCT/US2013/058616 International Search Report and Written Opinion dated Feb. 11, 2014.
PCT/US2013/070177 International Preliminary Report on Patentability dated May 28, 2015.
PCT/US2013/070177 International Search Report and Written Opinion dated Apr. 14, 2014.
PCT/US2014/025001 International Search Report and Written Opinion dated Jul. 14, 2014.
PCT/US2014/025004 International Search Report and Written Opinion dated Jul. 14, 2014.
PCT/US2014/025005 International Search Report and Written Opinion dated Jul. 14, 2014.
PCT/US2014/026619 International Search Report and Written Opinion dated Sep. 9, 2014.
PCT/US2014/036621 International Search Report and Written Opinion dated Sep. 4, 2014.
PCT/US2014/036623 International Search Report and Written Opinion dated Sep. 4, 2014.
PCT/US2014/038439 International Search Report and Written Opinion dated Sep. 30, 2014.
PCT/US2014/041124 International Search Report and Written Opinion dated Oct. 15, 2014.
PCT/US2014/065792 International Search Report and Written Opinion dated Apr. 9, 2015.
PCT/US2014/065796 International Search Report and Written Opinion dated Apr. 9, 2015.
PCT/US2014/065909 International Search Report and Written Opinion dated Feb. 19, 2015.
U.S. Appl. No. 61/819,414, filed May 3, 2013.
U.S. Appl. No. 13/743,951 Office Action dated Mar. 18, 2015.
U.S. Appl. No. 14/017,054 Office Action dated Aug. 27, 2014.
U.S. Appl. No. 14/017,054 Office Action dated Dec. 12, 2014.
Wong. The Temple of VTEC Asia Special Focus on the Multimatic Transmission. Temple of VTEC Asia. 2000.
Co-pending U.S. Appl. No. 15/260,472, filed Sep. 9, 2016.
Co-pending U.S. Appl. No. 15/265,163, filed Sep. 14, 2016.
Co-pending U.S. Appl. No. 15/265,226, filed Sep. 14, 2016.
Co-pending U.S. Appl. No. 15/272,774, filed Sep. 22, 2016.
Co-pending U.S. Appl. No. 15/284,940, filed Oct. 4, 2016.
PCT/US2016/029853 International Search Report and Written Opinion dated Aug. 8, 2016.
PCT/US2016/030930 International Search Report and Written Opinion dated Sep. 23, 2016.
PCT/US2016/038064 International Search Report and Written Opinion dated Sep. 7, 2016.
U.S. Appl. No. 14/425,600 Office Action dated Sep. 23, 2016.
U.S. Appl. No. 62/158,847, filed May 8, 2015.
PCT/US2014/065792 International Preliminary Report on Patentability dated Jun. 2, 2016.
PCT/US2014/065909 Written Opinion dated Jun. 6, 2016.

(56) References Cited

OTHER PUBLICATIONS

PCT/US2016/027496 International Search Report and Written Opinion dated Jul. 8, 2016.
U.S. Appl. No. 14/425,598 Office Action dated Jun. 14, 2016.
U.S. Appl. No. 14/425,842 Office Action dated Jul. 1, 2016.
U.S. Appl. No. 15/067,752 Office Action dated Jun. 30, 2016.
Co-pending U.S. Appl. No. 14/925,813, filed Oct. 28, 2015.
PCT/US2014/025001 International Preliminary Report on Patent ability dated Sep. 24, 2015.
PCT/US2014/025004 International Preliminary Report on Patentability dated Oct. 1, 2015.
PCT/US2014/025005 International Preliminary Report on Patentability dated Oct. 1, 2015.
PCT/US2014/026619 International Preliminary Report on Patentability dated Sep. 24, 2015.
PCT/US2014/036621 International Preliminary Report on Patentability dated Nov. 12, 2015.
PCT/US2014/036623 International Preliminary Report on Patentability dated Nov. 12, 2015.
PCT/US2014/038439 International Preliminary Report on Patentability dated Nov. 26, 2015.
PCT/US2014/065796 International Preliminary Report on Patentability dated Nov. 6, 2015.
PCT/US2014/065909 Written Opinion dated Dec. 11, 2015.
PCT/US2015/37916 International Search Report and Written Opinion dated Sep. 29, 2015.
U.S. Appl. No. 14/175,584 Office Action dated Dec. 3, 2015.
U.S. Appl. No. 14/210,130 Office Action dated Nov. 20, 2015.
U.S. Appl. No. 14/426,139 Office Action dated Oct. 6, 2015.
U.S. Appl. No. 14/542,336 Office Action dated Nov. 25, 2015.
Co-pending U.S. Appl. No. 15/067,427, filed Mar. 11, 2016.
Co-pending U.S. Appl. No. 15/067,752, filed Mar. 11, 2016.
U.S. Appl. No. 14/210,130 Office Action dated Jun. 7, 2016.
U.S. Appl. No. 14/378,750 Office Action dated Apr. 8, 2016.
U.S. Appl. No. 14/425,600 Office Action dated May 16, 2016.

* cited by examiner

CONTINUOUSLY VARIABLE TRANSMISSION

CROSS-REFERENCE

This application is filed pursuant to 35 U.S.C. § 371 as a United States National Phase Application of International Application No. PCT/US2013/070177, filed Nov. 14, 2013, which application claims the benefit of U.S. Provisional Application No. 61/727,689, filed Nov. 17, 2012 and U.S. Provisional Application No. 61/779,579, filed Mar. 13, 2013, which are incorporated herein by reference in their entirety.

BACKGROUND OF THE INVENTION

Transmissions can be used to vary the ratio of rotation of an input shaft to an output shaft. This variation of input rotation to output rotation can provide increased performance. The transmission speed ratio of at least some prior transmission can be discrete, for example with fixed gear ratios, which can make switching gears less than desirable. Recently, continuously variable transmissions have been proposed to provide a continuously variable transition speed ratio. The continuously variable transmission speed ratio can have the advantage of providing a smoother and continuous transition from a low speed ratio to a high speed ratio. However, the prior continuously variable transmissions can be more complex than would be ideal.

SUMMARY OF THE INVENTION

Embodiments of the present invention provide an improved continuously variable transmission. In many embodiments, the continuously variable transmission provides an increased transmission speed ratio with fewer parts. In many embodiments, a kinematic arrangement can provide a CVT speed ratio greater than the variator speed ratio based on a change in direction of a power flow through the variator at each mode change, and the input shaft of the variator can be coaxial with the output shaft of the variator, or non-coaxial with the output shaft of the variator. A squared kinematic arrangement of the variator can provide an increased range transmission speed ratio, such that the transmission overall ratio corresponds to the variator ratio squared. A cubed kinematic arrangement of the variator for three modes can provide an increased range transmission speed ratio, such that the transmission overall ratio corresponds to the variator ratio cubed. In many embodiments, additional modes can be provided to increase the overall ratio of the transmission even further so as to correspond to the variator ratio raised to a power equal to the number of modes. In many embodiments, the continuously variable transmission provides synchronous gear ratios and a continuously variable speed ratio.

In one aspect a continuously variable transmission comprises an input shaft, an output shaft and a variator comprising a first disk and a second disk. The first disk is coaxial with the second disk. One or more shafts and a plurality of gears are configured to operatively engage the input shaft and the output shaft. A first clutch is connected to the input shaft to engage the first disk. A third clutch is connected to the output shaft to engage the second disk. In a first configuration, the first clutch engages the first disk and the third clutch engages the second disk to transmit rotational energy across the variator in a first direction from the first disk to the second disk in order to connect the input shaft to the output shaft. In a second configuration, the one or more shafts and the plurality of gears operatively engages the input shaft and the output shaft to transmit rotational energy across the variator in a second direction from the second disk to the first disk in order to connect the input shaft to the output shaft, the first direction opposite the second direction.

In some embodiments a continuously variable transmission comprises an input shaft, an output shaft, a variator comprising a first disk and a second disk, the first disk coaxial with the second disk, one or more shafts and a plurality of gears configured to operatively engage the input shaft and the output shaft, a first clutch connected to the input shaft to engage the first disk and a third clutch connected to the output shaft to engage the second disk, wherein in a first configuration the first clutch engages the first disk and the third clutch engages the second disk to transmit rotational energy across the variator in a first direction from the first disk to the second disk in order to connect the input shaft to the output shaft.

In some embodiments, a continuously variable transmission comprises an input shaft, an output shaft, a variator comprising a first disk and a second disk, the first disk coaxial with the second disk, one or more shafts and a plurality of gears configured to operatively engage the input shaft and the output shaft, a fourth clutch and a second clutch, and the plurality of gears operatively engages the output shaft and the input shaft to transmit rotational energy across the variator in a second direction from the second disk to the first disk in order to connect the output shaft to the input shaft, the second direction opposite the first direction.

In some embodiments, a continuously variable transmission is disclosed wherein the input shaft, the output shaft and the variator extend along a common axis, the first disk located along the axis toward the input shaft, the second disk located along the axis toward the output shaft and wherein the first configuration comprises a direct configuration such that rotational energy is transmitted along the axis in the first direction from the input shaft to the output path.

In some embodiments, the continuously variable transmission is disclosed wherein the one or more shafts comprises a first countershaft connected to a first plurality of gears and a second countershaft connected to a second plurality of gears and wherein rotational energy is transmitted from the input shaft to the second disk with the first countershaft connected to the first plurality of gears and wherein rotational energy is transmitted from the first disk to the output shaft with the second countershaft connected to the second plurality of gears.

In some embodiments of the continuously variable transmission the first configuration comprises a low mode and the second configuration comprises a high mode. In other embodiments, of the continuously variable transmission the first configuration comprises a high mode and the second configuration comprises a low mode.

In some embodiments of the continuously variable transmission, the variator comprises a speed ratio and wherein the one or more shafts and the plurality of gears are configured to provide a synchronous shift when the variator comprises a maximum speed ratio.

In some embodiments of the continuously variable transmission, the first configuration and the second configuration are configured to provide synchronous gear ratios when the variator provides the maximum speed ratio or a minimum speed ratio and wherein a third clutch is configured to operatively engage the first ring and a fourth clutch is configured to engage the second ring and wherein the third clutch is configured to operatively connect to a gear on a downstream end of the second shaft and the fourth clutch is configured to connected to a gear on an upstream end of the second shaft to transmit energy in the second direction from second ring to the first ring.

In still other embodiments, the continuously variable transmission, the gear tooth counts have been selected so that a product of a gear on a downstream end of the second shaft times a gear on the input shaft divided by a product of a gear on an upstream end of the second shaft times a gear operatively connected to a fourth clutch is equal to a variator overdrive ratio and a product of a gear on a downstream end of the first shaft times a gear operatively connected to a third clutch divided by the product of a gear on the output shaft times a gear on an upstream end of the first shaft is equal to the variator overdrive ratio in order to provide the synchronous shift.

In still other embodiments, of the continuously variable transmission, the transmission is configured to make a synchronous shift at an underdrive ratio and wherein a product of a gear on a downstream end of the second shaft times a gear on the input shaft divided by a product of a gear on an upstream end of the second shaft times a gear operatively connected to a third clutch is equal to a variator underdrive ratio and a product of a gear on a downstream end of the first shaft times a gear operatively connected to a third clutch divided by a product of a gear on the output shaft times a gear on an upstream end of the first shaft is equal to the variator underdrive ratio in order to provide the synchronous shift at the underdrive ratio.

In another aspect, a continuously variable transmission is described wherein the variator comprises a plurality of rotatable balls configured to provide a continuously variable ratio of rotation of the input to the output disk in response to tilt angle of the plurality of rotatable balls.

Provided herein is a method for providing a continuously variable transmission comprising an input shaft, an output shaft, a variator comprising a first disk and a second disk, the first disk coaxial with the second disk, one or more shafts and a plurality of gears configured to operatively engage the input shaft and the output shaft, a first clutch connected to the input shaft to engage the first disk, and a second clutch connected to the output shaft to engage the second disk, wherein in a first configuration the first clutch engages the first disk and the second clutch engages the second disk to transmit rotational energy across the variator in a first direction from the first disk to the second disk in order to connect the input shaft to the output shaft.

In another aspect of the method, the one or more shafts and the plurality of gears operatively engages the input shaft and the output shaft to transmit rotational energy across the variator in a second direction from the second disk to the first disk in order to connect the input shaft to the output shaft, the first direction opposite the first direction.

In another aspect of the method, the transmission also has a reverse mode. In the reverse mode, the power from the launch device will be taken off the input shaft and transferred to the lower counter shaft. This results in the lower counter shaft spinning backwards at half of the input shaft speed. Power is taken off the lower counter shaft by applying the reverse clutch which directs power to a reverse gear in mesh with the axle shaft rotation gear in specific embodiments. The reverse ratio should generally be the same ratio as maximum underdrive but in the opposite direction.

In many embodiments, power does not go through the variator in the reverse mode.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Continuously variable transmissions (CVT) typically incorporate a variator that is capable of producing a limited speed ratio in only one direction. Some prior continuously variable transmissions have less than ideal speed ratio ranges and more parts than would be ideal. At least some of the prior continuously variable transmissions rely on more modes and more gears than would be ideal to provide a beneficial range of the continuously variable speed ratio. For example, some prior continuously variable transmissions may be configured in a manner that results in a variator which has a 4:1 overall ratio to perform as a 2:1 overall transmission ratio. Also, at least some of the prior continuously variable transmissions may have reduced input torque capacity and additional modes and gears to counteract the reduced variator overall ratio range.

In at least some instances, prior continuously variable transmissions have less than ideal sizes and form factors which can make the prior continuously variable transmissions difficult to use. For example, motor vehicles and bicycles can provide limited amounts of space for placement of a transmission. Further, weight can be an important consideration and the prior continuously variable transmissions may be larger and heavier than would be ideal.

In light of the above, it would be desirable to have improved continuously variable transmissions with fewer moving parts, an extended transmission speed ratio, and decreased weight and complexity.

The embodiments of the present invention as described herein will find many applications. For example, although reference is made to vehicular applications, the continuously variable transmission as described herein can be used in many applications such as bicycles, motorized vehicles and power tools, for example.

Figure 1A:
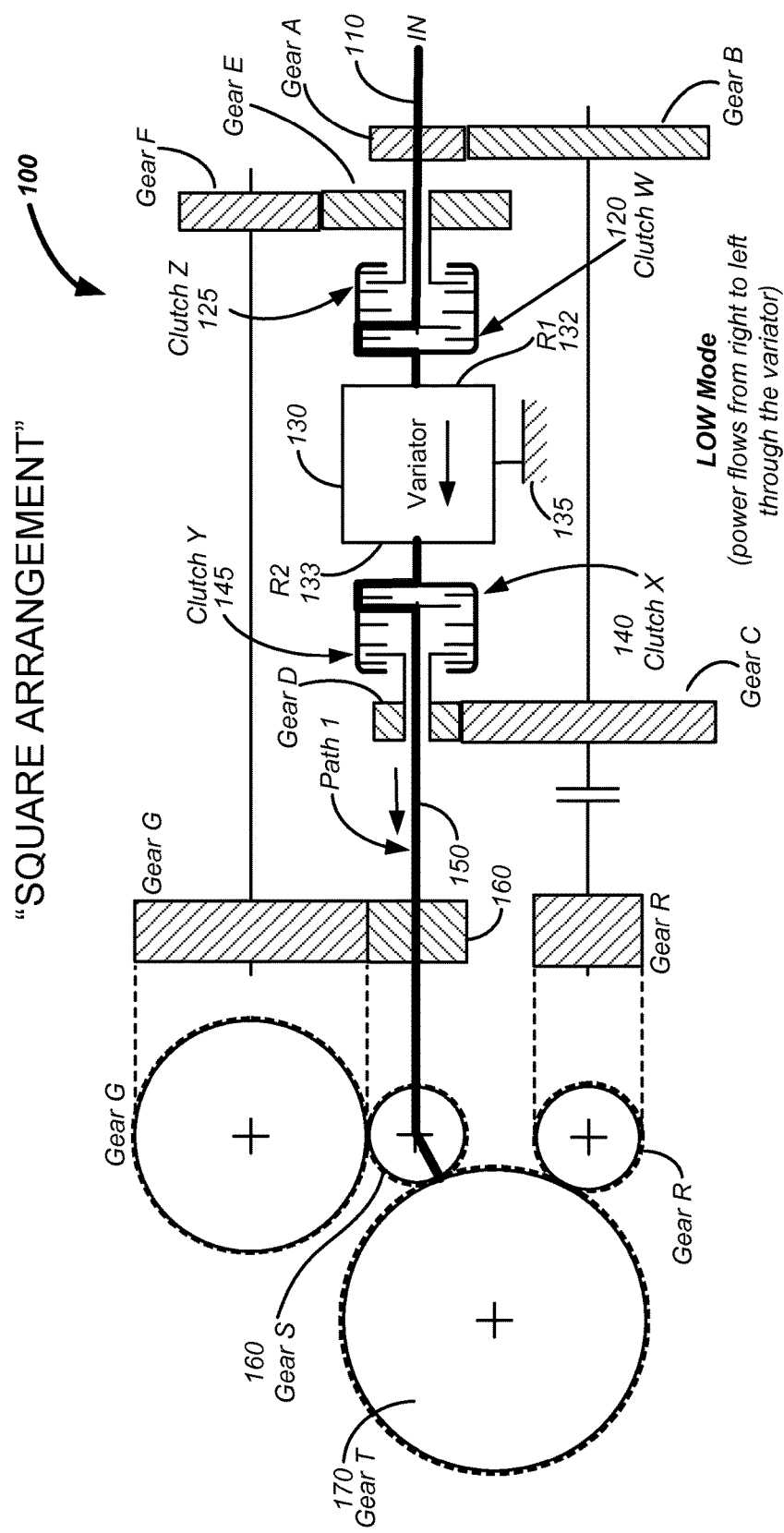
FIG. 1A shows a square arrangement of a continuously variable transmission with power flow through the variator in a first direction, in accordance with embodiments.
Figure 1B:
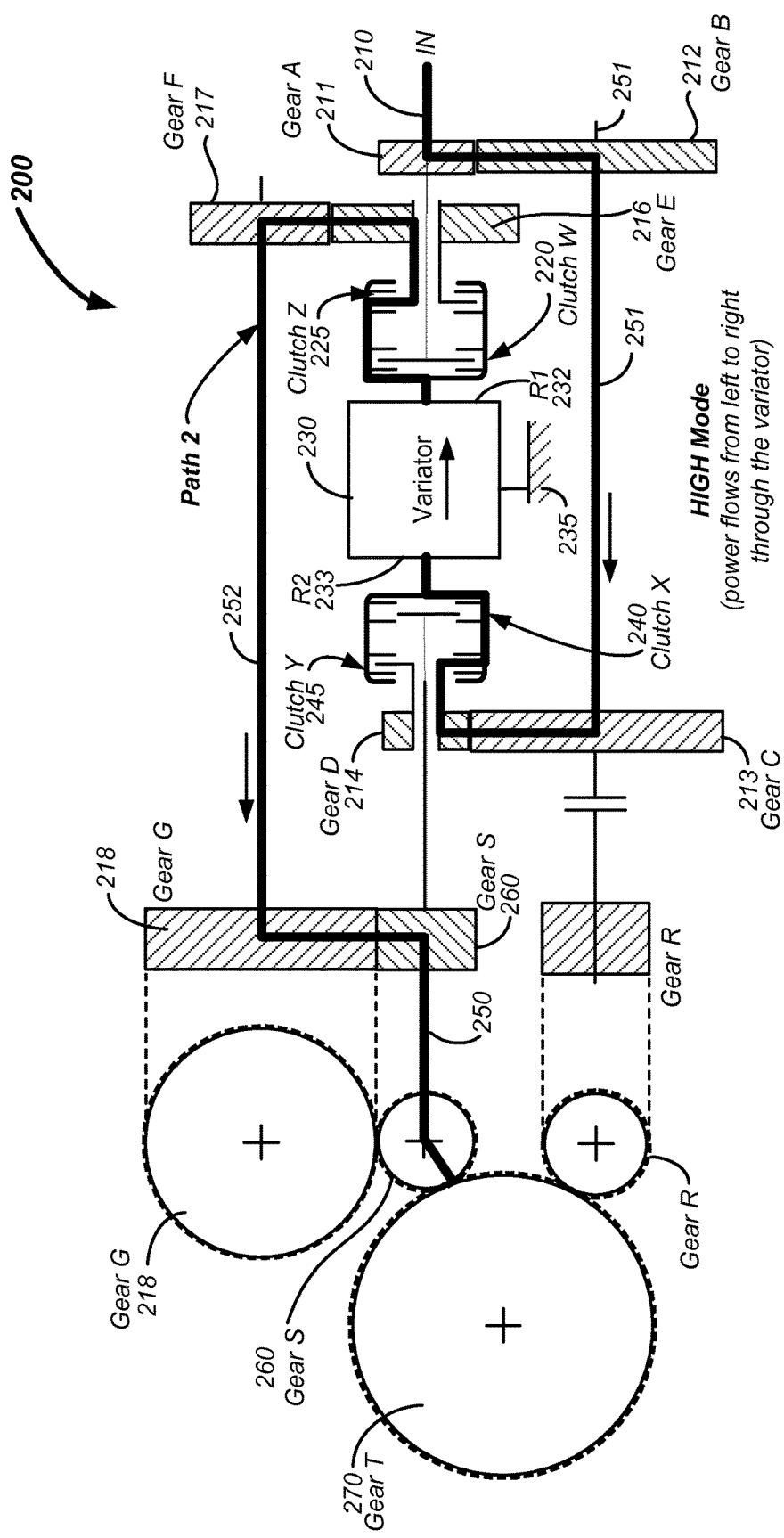
FIG. 1B shows a high mode of the continuously variable transmission of FIG. 1A with power flow through the variator in a second direction opposite the first direction, in accordance with embodiments.

While FIGS. 1A-B depicts some embodiments, other embodiments are possible. While FIGS. 1A-B will be used to describe the operation of the invention in accordance with embodiments, a person of ordinary skill in the art will recognize many embodiments in accordance with the present disclosure.

The embodiments depicted in FIGS. 1A-B use a variator. The variator can be coaxial, or a non-coaxial variator. The variator may comprise one or more components of a commercially available coaxial variator tilting ball variator, for example one or more components of a variator commercially from the Fallbrook Technologies, Inc. Alternatively, variator may comprise one or more components of a commercially available non-coaxial variator, for example commercially available from Van Dorne.

Figure 2A:
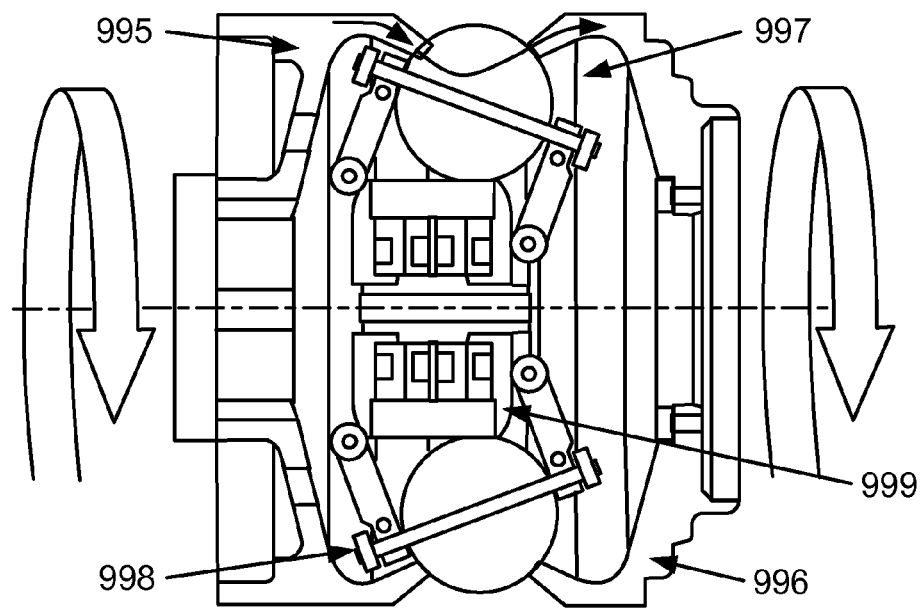
FIG. 2A depicts certain elements of an embodiment CVP in accordance with embodiments.

This CVT comprises of a certain number of balls 997 (for example, 3-15 balls) to transfer torque through multiple fluid patches, depending on the application, two discs 995, 996 or annular rings each having an engagement portion that engages the variator balls as input and output as shown on FIG. 2A. The balls are placed in a circular array around a central idler (sun) and contact separate input and output traction rings. The engagement portions may be in a conical or toroidal convex or concave surface contact with the variator balls, as input and output. The CVT may include an idler 999 contacting the balls as well as shown on FIG. 2A. The variator balls are mounted on axes 998, themselves held in a cage or carrier allowing changing the ratio by tilting the variator balls' axes. This configuration allows the input and output to be concentric and compact. The result is the ability to sweep the transmission through the entire ratio range smoothly, while in motion, under load, or stopped.

Figure 2B:
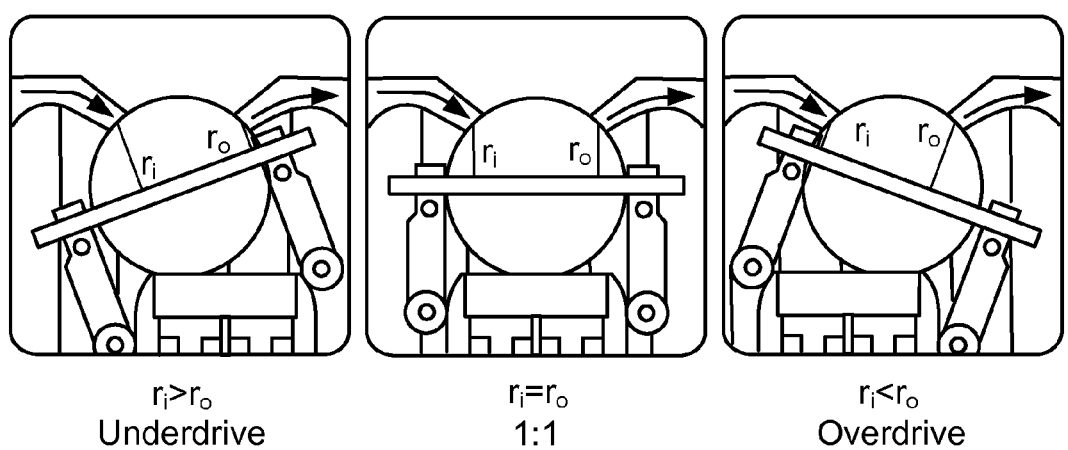
FIG. 2B depicts a ratio change mechanism in an embodiment CVP in accordance with embodiments.

Other types of ball CVTs also exist like the one produced by Milner but are slightly different. These alternative ball CVTs are additionally contemplated herein. As shown in FIG. 2B, a variator is a system that uses a set of rotating and tilting balls in a carrier that is positioned between input and output rings. Tilting the balls changes their contact diameters and varies the speed ratio. As a result, the variator system offers continuous transition to any ratio within its range. The gear ratio is shifted by tilting the axes of the spheres in a continuous fashion, to provide different contact radii, which in turn drive the input and output rings, or discs. The multiple balls transfer torque through multiple fluid patches. The balls are placed in a circular array around a central idler (sun) and contact separate input and output traction rings. This configuration allows the input and output to be concentric and compact. The result is the ability to sweep the transmission through the entire ratio range smoothly, while in motion, under load, or stopped.

A traction fluid is optionally located in the variator for lubrication and traction. When this fluid undergoes high contact pressures under rolling contact between the two rolling elements, the balls and the rings, the fluid undergoes a near-instantaneous phase transition to an elastic solid. Within this patch of traction the molecules of the fluid stack up and link to form a solid, through which shear force and thus torque can be transferred. Note that the rolling elements are actually not in physical contact when rotating.

Turning back to FIGS. 1A-B, the transmission is depicted with the input side on the right hand side and the output side on the left hand side of the page. At the right hand side, a power source, such as an engine or motor, would be provided for connection to the input shaft. The power source is not depicted and not necessary to an understanding of the present disclosure. A launching device would be connected between the power source and the transmission. The launching device might be such as a clutch, torque converter, or fluid coupling. The launching device is not depicted. The launching device would be connected to the input shaft, which is depicted on the right hand side of the transmission.

The depicted transmission may have two or more modes, a high mode and a low mode; the low mode is depicted in FIG. 1A and the high mode is depicted in FIG. 1B. In the low mode, power flows along a first path and through the variator in a first direction. In the high mode, power flows along a second path and through the variator in a second direction opposite the first direction. In many embodiments the rings of the variator are coaxial and concentrically arranged. Further, the input shaft, the output shaft, and the variator rings may comprise a coaxial arrangement although other arrangements are possible.

The low mode in FIG. 1A, will be described first.

In the low mode 100, the power flows along Path 1. The transmission comprises an input shaft 110 coupled to a power source (not shown). The input shaft 110 is coupled to a first clutch 120 (Clutch W) that can be coupled to an input shaft of the variator 130 when the clutch is engaged. The variator comprises an output shaft coupled to a third clutch 140 (Clutch X). The third clutch can be coupled to an output shaft of the transmission 150.

In the low mode 100, power from the launch device will be connected to Ring 1 (R1) 132 of the variator 130 by applying first Clutch (W), 120. The variator Carrier (C) 135 is grounded and the output of the variator will be Ring 2 (R2) 133 in the low mode. The output of third clutch (X) 140 is connected to Ring (R2) 133 of the variator. The variator 130 can be connected to a structure to vary the ratio of the variator. The variator 130 comprises a transmission speed ratio (hereinafter "SR"). The transmission speed ration can be continuously varied and can be varied from about 0.5 to 2.0, for example, although many ranges can be achieved.

In the low mode, Ring 2 (R2) 133 will be connected to the output shaft 150 by applying third Clutch (X) 140 (located to the left of the variator in FIG. 1A). The power will then be connected to Gear (S) 160, which may be a tooth gear, such as a 30 tooth for example in some embodiments. Gear (S) 160 is located on the output shaft 150. Gear (S) 160 is engaged with a Gear (T) 170, which may be final drive gear, for example a 120 tooth final drive gear in some embodiments. Gear (T) 170 is connected to the differential and axle shafts (not shown).

On the left side of FIGS. 1A and 1B, the circles show the end view of the gears (G), (R), (S), and (T) and how the gears mesh. For example, the Gears (G), (S), and (R) are shown in both the cross sectional view and the end view on the left of FIG. 1A. Gear (T) is in constant mesh with Gears (S) and (R) as shown in the end view. This low mode results in the power flowing in a first direction from right to left in the FIG. 1A directly through the variator to the final drive Gears (S) and (T).

This kinematic arrangement shown in FIG. 1A can be referred to as a "square" kinematic arrangement. The embodiments as described herein provide a squared kinematic arrangement for two or more modes, for example, and can provide an increased range transmission speed ratio with fewer moving parts. The term "square" comes from the two mode arrangement resulting in the transmission overall ratio being equal to the variator overall ratio squared, i.e. a 3:1 overall ratio variator with two modes results in a 9:1 overall ratio transmission. Adding additional modes will increase the overall transmission ratio range by the raising the variator ratio range to a power which is equal to the number of ranges. The general power relationship in accordance with embodiments is described by the following equation:

$$\text{Transmission overall ratio} = \text{Variator overall ratio}^{Number\ of\ ranges}$$

For example, a 3:1 overall ratio variator with three modes results in a 27:1 overall ratio transmission. A 4:1 overall ratio variator with two modes will result in a 16:1 ratio. A person of ordinary skill in the art can configure the transmission as described herein in many ways, for example with many combinations of variator ratios and numbers of ranges.

The square arrangement shown in FIG. 1A reverses the direction of power from one mode to the next (i.e. the input element of the variator for one mode becomes the output element for the second mode). The square arrangement of FIG. 1A provides a coaxial arrangement of the input disk 132 and the output disk 133.

FIG. 1B depicts the transmission 200 operating in the high mode. The power flows along Path 2 and through the variator 230 in a direction opposite the low mode. In the high mode, first and second counter shafts 251, 252 are coupled to the input shaft 210 and output shaft 250 respectively so that power flows in the second direction through the variator 230. A first shaft is coupled to a first plurality of gears to operatively engage the second ring of the variator. A second shaft is coupled to a second plurality of gears to operatively engage the first ring of the variator. This operative engagement allows the power to flow along the second path opposite the first path.

In the high mode 200, the power from the launch device (not shown) will be taken off the input shaft 210 by Gear (A) 211, which may be such as a 30 tooth gear in specific embodiments. Gear (A) 211 is located on the right side of the variator 230 in FIG. 1B. Gear (A) transfers power to the lower counter shaft 251 which has Gear (B) 212. Gear (B) may be a 60 tooth gear in specific embodiments. Gear (A) 211 is shown engaged with Gear (B) 212.

The engagement of Gear (A) and (B) results in the lower counter shaft 251 spinning backwards at a lower speed than the input shaft speed 210, for the speed ratios and gear tooth counts described earlier, the counter shaft spins backward at half of the input shaft speed. Power is taken off the lower counter shaft 251 by Gear (C) 213, which may be a 60 tooth gear in specific embodiments. Gear (C) 213 is shown in driving connection with Gear (D) 214. Gear (D) may comprise a 15 tooth gear in specific embodiments, for example.

The above-described arrangement results in the input to the fourth clutch (Y) 245 that is located to the left of the variator 230 in FIG. 1B spinning forward at twice input speed. The fourth clutch (Y) 245 located to the left of the variator 230 in FIG. 1B is applied, thus connecting Gear (D) 214 to Ring 2 (R2) 233, which is now functioning as the input to the variator 230.

The variator 230 will output the power to the right in Ring 1 (R1) 232, which is connected to the clutch housing located to the right of the variator. Second clutch (Z) 225 will be applied thus connecting Ring 1 (R1) 232 to Gear (E) 216, which may comprise a 45 tooth gear in specific embodiments. Power is then transferred from Gear (E) 216 to the Gear (F) 217, which may comprise a 45 tooth gear in specific embodiments. Gear (F) 217 is connected to the upper counter shaft 252.

The driving connection between Gear (E) 216 and Gear (F) 217 results in the upper counter shaft 252 spinning backwards at the same speed as Ring 1 (R1) 232. The power is then taken off the upper counter shaft 252 by Gear (G) 218, which may comprise a 60 tooth gear in specific embodiments. Gear (G) 218 is located on the left end of the upper counter shaft 252 in FIG. 1B. Gear (G) 218 is meshed with Gear (S) 260, which may comprise a 30 tooth gear in specific embodiments. Gear (S) 260 will now be spinning forward at twice the speed of Ring 1 (R1) 232 which is now functioning as the output of the variator 230. Gear (T) 270, the axle shaft rotation gear, is in constant mesh with Gear (S) 260 as shown in the end view.

The high mode 200 power flows through four additional gear meshes and the direction of power flow through the variator (left to right) is backwards relative to the low mode (right to left). In many embodiments, the transmission arrangement has the upper and lower counter shafts oriented parallel to each other and the input and outputs shafts of the transmission.

In many embodiments, the input shaft, the output shaft, and the variator are aligned along a common axis, and power flow Path 1 can extend along the axis through the input shaft, the variator, and the output shaft in the first direction. Further, although Path 1 is shown in the low mode, a person of ordinary skill in the art will recognize that the gear ratios can be changed so that energy flows along Path 1 in the high mode and along Path 2 in the low mode, by changing the ratios of the gears on the shafts as described herein.

Although in specific embodiments as described herein gears with a particular gear tooth count are mentioned, the present disclosure is not limited to these mentioned gear tooth counts, and may be different, for example greater or less than the values provided.

The transmission also has a reverse mode 300 in many embodiments. The reverse mode 300 can be readily appreciated based on the following description with reference to FIG. 1C. In the reverse mode, the power from the launch device will be taken off the input shaft 310 by Gear (A) 311 (a 30 tooth gear in specific embodiments) and transferred to the lower counter shaft 351 through Gear (B) 312 (a 60 tooth gear in specific embodiments), which is meshed with Gear A 311. This results in the lower counter shaft 351 spinning backwards at half of the input shaft speed. Power is taken off the lower counter shaft 351 by applying the reverse clutch (Rev) 347 which directs power to Gear (R) 365, which may comprise a 30 tooth gear in specific embodiments. Gear (R) 365 is in mesh with Gear (T) 370, the axle shaft rotation gear, which may comprise a 120 tooth final drive gear in specific embodiments. The reverse ratio should generally be the same ratio as maximum underdrive but in the opposite direction. In many embodiments, power does not go through the variator in the reverse mode.

The gear arrangement shown in FIGS. 1A and 1B results in the axle shaft rotation [Gear (T)] being in the opposite direction as the input shaft when directing power through the variator. This reverse direction is helpful for a transverse mount front wheel drive vehicles that mount the transmission on the right side of the vehicle with conventional direction of engine rotation. For vehicles that utilize conventional engine rotation and place the transmission on the left side of the engine it is helpful to have the axle shaft rotation in the same direction as the input shaft direction when directing power through the variator. A solution to providing the required direction reversal is to add an extra pair of external gears in series with the input or output, in specific embodiments. An alternative solution with fewer moving parts would be to attach the launch device output to the lower counter shaft rather than the input shaft with the required change in the gear tooth counts to return to the desired overall transmission speed ratio.

The reverse Gear (R) may have its tooth count adjusted in order to provide the desired overall reverse gear ratio with only Gears (R) and (T). In some embodiments, the other gear tooth counts remain the same and the variator functions at twice engine speed. In alternative embodiments, Gears (A) and (B) have identical tooth counts and Gears (C) and (D) have a tooth count ratio equal to the variator overdrive ratio in order to achieve a synchronous shift.

In many embodiments, the gear tooth counts have been selected so that the product of Gear (C) times Gear (A) divided by the product of Gear (B) times Gear (D) is equal to the variator overdrive ratio and the product of Gear (G) times Gear (E) divided by the product of Gear (S) times Gear (F) is also equal to the variator overdrive ratio. With these embodiments having the selected gear ratios, it is possible to make the low-high shift synchronous in that all of the internal components spin at the same speed before, during, and after the shift. This allows a high quality shift to be made by delivering the synchronous speed ratio in the variator (2.0:1 in this specific embodiment) and then fully applying both oncoming clutches prior to releasing either of the off going clutches. The gear tooth counts provided in this disclosure allow a synchronous shift (both low to high and high to low) when the variator provides a 2.0:1 overdrive ratio, although other ratios can be provided.

Figure 3:
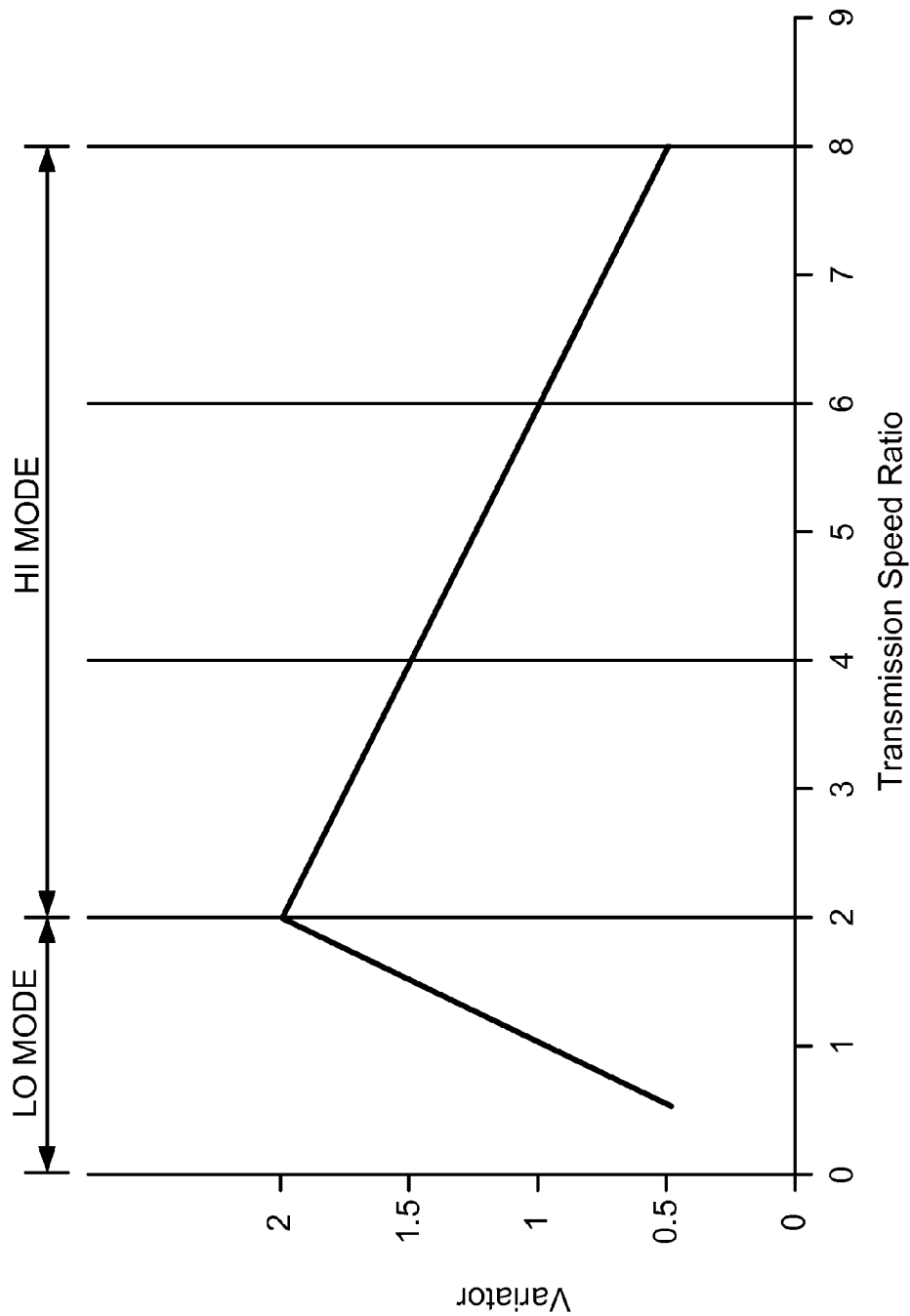
FIG. 3 shows a graph of the transmission speed ratio on the X axis and the variator speed ratio on the Y axis, in accordance with embodiments.

The above can be appreciated by FIG. 3 which depicts a graph of the transmission speed ratio (hereinafter "SR") on the X axis and the variator speed ratio on the Y axis. The low mode is depicted as starting at a transmission speed ratio of 0.5:1 and increasing to 2.0:1 while the variator speed ratio increases from 0.5:1 to 2.0:1. At transmission and variator speed ratios of 2.0:1, the transmission speed ratio increases while the variator speed ratio decreases from 2.0:1 to 0.5:1.

Based on the present disclosure, a person of ordinary skill in the art will recognize that it is also possible to make a synchronous shift at the variator underdrive ratio where the product of Gear (C) times Gear (A) divided by the product of Gear (B) times Gear (D) is equal to the variator underdrive ratio and the product of Gear (G) times Gear (E) divided by the product of Gear (S) times Gear (F) is also equal to the variator underdrive ratio. This causes the low range to use the power flow path (Path 2) shown in FIG. 1B and the high range to use the power flow path (Path 1) shown in FIG. 1A.

Figure 1C:
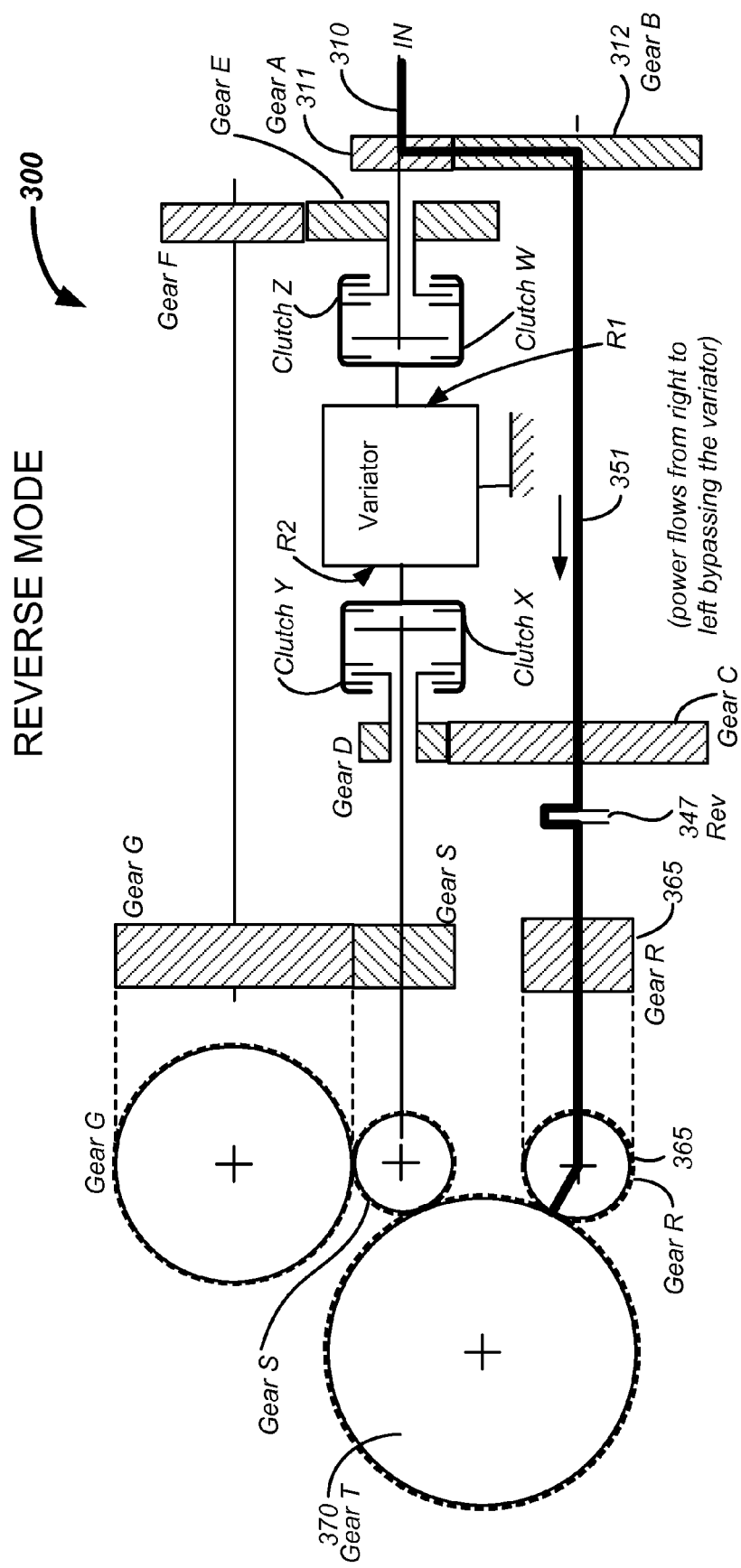
FIG. 1C shows a reverse mode of a continuously variable transmission of FIG. 1A with power flow bypassing the variator in a first direction through a lower counter shaft, in accordance with embodiments.

Further, the embodiments shown in FIGS. 1A and 1B can be configured with reverse rotation such as illustrated in the embodiment shown in FIG. 1C, or alternative rotation configurations that will be readily apparent to a person of ordinary skill in the art based on the disclosure provide herewith.

Embodiments of the variable transmission described herein or that would be obvious to one of skill in the art upon reading the disclosure herein, are contemplated for use in a variety of vehicle drivelines. For example, the variable transmissions disclosed herein may be used in bicycles, mopeds, scooters, motorcycles, automobiles, electric automobiles, trucks, sport utility vehicles (SUV's), lawn mowers, tractors, harvesters, agricultural machinery, all terrain vehicles (ATV's), jet skis, personal watercraft vehicles, airplanes, trains, helicopters, buses, forklifts, golf carts, motorships, steam powered ships, submarines, or space craft.

While the figures and description herein are directed to ball-type variators (CVTs), alternate embodiments are contemplated using another version of a variator (CVT), such as a Variable-diameter pulley (VDP) or Reeves drive, a toroidal or roller-based CVT (Extroid CVT), a Magnetic CVT or mCVT, Ratcheting CVT, Hydrostatic CVTs, Naudic Incremental CVT (iCVT), Cone CVTs, Radial roller CVT, Planetary CVT, or any other version CVT.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A continuously variable transmission, comprising:
   an input shaft;
   an output shaft;
   a variator comprising a first disk and a second disk, the first disk coaxial with the second disk;
   one or more shafts and a plurality of gears configured to operatively engage the input shaft and the output shaft;
   a first clutch connected to the input shaft to engage the first disk; and
   a third clutch connected to the output shaft to engage the second disk;
   wherein the variator comprises a plurality of rotatable balls configured to provide a continuously variable ratio of rotation of the input to the output disk in response to tilt angle of the plurality of rotatable balls,
   wherein in a first configuration the first clutch engages the first disk and the third clutch engages the second disk to transmit rotational energy across the variator in a first direction from the first disk to the second disk in order to connect the input shaft to the output shaft;
   wherein in a second configuration the one or more shafts, a fourth clutch and a second clutch, and the plurality of gears operatively engages the output shaft and the input shaft to transmit rotational energy across the variator in a second direction from the second disk to the first disk in order to connect the output shaft to the input shaft, the second direction opposite the first direction.

2. The continuously variable transmission of claim 1, further comprising a traction fluid in the variator for lubrication and traction.

3. The continuously variable transmission of claim 1, wherein the input shaft, the output shaft and the variator extend along a common axis, the first disk located along the axis toward the input shaft, the second disk located along the axis toward the output shaft and wherein the first configuration comprises a direct configuration such that rotational energy is transmitted along the axis in the first direction from the input shaft to the output shaft.

4. A vehicle comprising the continuously variable transmission of claim 3.

5. The continuously variable transmission of claim 3, wherein the one or more shafts comprises a first countershaft connected to a first plurality of gears and a second countershaft connected to a second plurality of gears and wherein rotational energy is transmitted from the input shaft to the second disk with the first countershaft connected to the first plurality of gears and wherein rotational energy is transmitted from the first disk to the output shaft with the second countershaft connected to the second plurality of gears.

6. A vehicle comprising the continuously variable transmission of claim 5.

7. The continuously variable transmission of claim 5, wherein the first configuration comprises a low mode and the second configuration comprises a high mode.

8. The continuously variable transmission of claim 5, wherein the first configuration comprises a high mode and the second configuration comprises a low mode.

9. The continuously variable transmission of claim 5, wherein the variator comprises a speed ratio and wherein the one or more shafts and the plurality of gears are configured to provide a synchronous shift when the variator comprises a maximum speed ratio.

10. The continuously variable transmission of claim 9, wherein the first configuration and the second configuration are configured to provide synchronous gear ratios when the variator provides the maximum speed ratio or a minimum speed ratio and wherein the second clutch is configured to operatively engage the first disk and the fourth clutch is configured to engage the second disk and wherein the second clutch is configured to operatively connect to a gear on a downstream end of the second countershaft and the fourth clutch is configured to connected to a gear on an upstream end of the second countershaft to transmit energy in the second direction from second disk to the first disk.

11. A vehicle comprising the continuously variable transmission of claim 10.

12. A method comprising providing the continuously variable transmission of claim 10.

13. The continuously variable transmission of claim 9, wherein gear tooth counts have been selected so that a product of a gear (Gear C) on a downstream end of the first countershaft times a gear (Gear A) on the input shaft divided by a product of a gear (Gear B) on an upstream end of the first countershaft times a gear (Gear D) operatively connected to the fourth clutch is equal to a variator overdrive ratio and a product of a gear (Gear G) on a downstream end of the second countershaft times a gear (Gear E) operatively connected to the second clutch divided by the product of a gear (Gear S) on the output shaft times a gear (Gear F) on an upstream end of the second countershaft is equal to the variator overdrive ratio in order to provide the synchronous shift.

14. A vehicle comprising the continuously variable transmission of claim 13.

15. A method comprising providing the continuously variable transmission of claim 13.

16. The continuously variable transmission of claim 9, wherein the transmission is configured to make a synchronous shift at an underdrive ratio and wherein a product of a gear (Gear C) on a downstream end of the first countershaft times a gear (Gear A) on the input shaft divided by a product of a gear (Gear B) on an upstream end of the first countershaft times a gear (Gear D) operatively connected to the third clutch is equal to a variator underdrive ratio and a product of a gear (Gear G) on a downstream end of the second countershaft times a gear (Gear E) operatively connected to the second clutch divided by a product of a gear (Gear S) on the output shaft times a gear (Gear F) on an upstream end of the second countershaft is equal to the variator underdrive ratio in order to provide the synchronous shift at the underdrive ratio.

17. A vehicle comprising the continuously variable transmission of claim 16.

18. A method comprising providing the continuously variable transmission of claim 16.

19. A method comprising:
providing a continuously variable transmission comprising an input, shaft, an output shaft, a variator comprising a first disk and a second disk, the first disk coaxial with the second disk, one or more shafts and a plurality of gears configured to operatively engage the input shaft and the output shaft, a first clutch directly connected to the input shaft to engage the first disk, and a second clutch directly connected to the output shaft to engage the second disk;
wherein the variator comprises a plurality of rotatable balls configured to provide a continuously variable ratio of rotation of the input to the output disk in response to tilt angle of the plurality of rotatable balls,
wherein in a first configuration the first clutch engages the first disk and the second clutch engages the second disk to transmit rotational energy across the variator in a first direction from the first disk to the second disk in order to connect the input shaft to the output shaft;
wherein in a second configuration the one or more shafts and the plurality of gears operatively engages the input shaft and the output shaft to transmit rotational energy across the variator in a second direction from the second disk to the first disk in order to connect the input shaft to the output shaft, the first direction opposite the first direction.

* * * * *

UNITED STATES PATENT AND TRADEMARK OFFICE
CERTIFICATE OF CORRECTION

PATENT NO. : 10,030,748 B2
APPLICATION NO. : 14/442580
DATED : July 24, 2018
INVENTOR(S) : Raymond James Haka It is certified that error appears in the above-identified patent and that said Letters Patent is hereby corrected as shown below:

In the Specification

Column 3, Line 50 "the first direction opposite the first direction" should be replaced with "the second direction opposite the first direction".

In the Claims

In Claim 10, Column 11, Line 24 "to connected to" should be replaced with "to connect to".

In Claim 19, Column 12, Lines 45-46 "the first direction opposite the first direction" should be replaced with "the second direction opposite the first direction".

Signed and Sealed this
Fourth Day of December, 2018

Andrei Iancu
*Director of the United States Patent and Trademark Office*